United States Patent [19]
Ayres et al.

[11] Patent Number: 5,314,065
[45] Date of Patent: May 24, 1994

[54] SHEET METAL CLIP

[75] Inventors: Donald B. Ayres, Skokie, Ill.; Thomas J. Wells, Carthage, Mo.

[73] Assignee: L&P Property Management Company, Chicago, Ill.

[21] Appl. No.: 92,336

[22] Filed: Jul. 15, 1993

Related U.S. Application Data

[63] Continuation-in-part of Ser. No. 56,195, May 3, 1993.

[51] Int. Cl.⁵ .............................................. B65D 71/06
[52] U.S. Cl. ...................................... 206/340; 53/397
[58] Field of Search ................................ 53/397, 399; 206/338–348, 526

[56] References Cited

U.S. PATENT DOCUMENTS

| | | |
|---|---|---|
| 3,613,878 | 10/1971 | Langas et al. |
| 3,711,931 | 1/1973 | Ladouceur et al. |
| 3,722,669 | 3/1973 | Meier et al. |
| 3,722,670 | 3/1973 | Plunkett |
| 4,508,220 | 4/1985 | Pearson |

FOREIGN PATENT DOCUMENTS

| | | |
|---|---|---|
| 2250375 | 10/1972 | Fed. Rep. of Germany |
| 2023216A | 12/1979 | United Kingdom |

*Primary Examiner*—Jimmy G. Foster
*Attorney, Agent, or Firm*—Wood, Herron & Evans

[57] ABSTRACT

An improved sheet metal clip is interconnected in a collated stack of clips with a plastic rope inserted within side slots on each side edge of each clip. Each clip is generally U-shaped having a crown portion with a pair of parallel spaced leg portions depending from the crown portion. The rope is inserted within the side slots formed in the side edges of each clip. The preferred embodiment of the improved clip includes crown slots which are inwardly extending from each side edge of the crown portion. The rope can be retained within the slots by deflecting tabs on each lateral side edge of the crown portion to enclose the rope within the side slots. The collated stack of clips interconnected with the plastic rope of the present invention provides the needed flexibility and tensile strength for use in manufacturing applications and does not detrimentally affect the operation of the clip in clamping wires and springs together.

7 Claims, 1 Drawing Sheet

SHEET METAL CLIP

This is a continuation-in-part of application Ser. No. 08/056,195 filed May 3, 1993 and assigned to the assignee of this invention.

BACKGROUND OF THE INVENTION

This invention relates to an improved sheet metal clip. More particularly, it relates to an improved stack of sheet metal clips in which the clips are collated or interconnected for storage or for use in a clinching tool.

It is well known in the mattress and bedding industries to join wire and spring elements together with a sheet metal clip. A typical clip for use in such applications is generally U-shaped having an arcuate crown portion and oppositely spaced leg portions depending from the crown portion. Such a U-shaped clip is clamped onto wires or bedsprings by a clinching tool. A typical clinching tool for use with U-shaped clips includes a generally J-shaped jaw into which the leading clip in a stack of clips is indexed. The clinching tool has a blade which upon actuation thrusts downwardly to shear off the leading clip from the stack of clips and thereby clamp the leading clip around a pair of wires positioned within the J-shaped jaw. A typical clinching tool of the type described is illustrated in U.S. Pat. No. 2,574,811.

The sheet metal clips are collated and aligned in a stack configuration such that each clip is similarly oriented and in abutting relationship with the adjacent clip. The clips are maintained in the stacked configuration for both storage and for use with the clinching tool. For storage, the stack of clips is typically wound under tension upon a cylindrical core member to provide a compact spool of interconnected clips. For use, the stack of clips is unwound under tension beginning with the free end of the stack, which is inserted into the clinching tool for use in clamping a plurality of wires together.

The clips must be interconnected in the stacked configuration so that they are sufficiently flexible to be wound onto a spool and also be interconnected with sufficient strength to withstand the high tensile forces associated with the winding and unwinding of the stack of clips upon the spool. However, the method of joining the clips in a stack configuration, while possessing the requisite strength and flexibility, cannot interfere with the operation of existing clinching tools. Likewise, the structure used to interconnect the sheet metal clips in a stack configuration must not detrimentally affect the ultimate clamping of the clip on a plurality of wires.

One prior solution for interconnecting clips in such a manner is disclosed in U.S. Pat. No. 3,722,670 in which a clip assembly utilizes an elongated strand of plastic filament along each lateral edge of the stack. The plastic filament is inserted into pre-formed notches on each side edge of each clip of the stack. However, the plastic filament is held in the notches only by frictional forces. Therefore, any pulling force or tension applied to the stack of clips, such as the forces applied while winding or unwinding the clip stack or indexing the clip stack into a clinching tool, would act to dislodge the filament from the notches of individual clips and thereby misalign or separate those clips from the clip assembly. The plastic filament interconnection as disclosed in U.S. Pat. No. 3,722,670, being merely frictionally engaged within the side notches of each clip, does not sufficiently interconnect the clips for use in an industrial application.

Another prior solution to the above-described problem is disclosed in U.S. Pat. No. 4,508,220 in which the individual U-shaped clips of a clip stack are interconnected by a small diameter flexible metal wire which is welded or otherwise secured to the crown portion of the clips by a metal to metal bond. While such an interconnection may provide the adequate strength and flexibility required of a stack of clips, a problem with the arrangement as disclosed in this patent is that when the leading clip is severed from the remainder of the stack, the severed interconnecting wire welded to the crown portion of each clip presents a sharp, abrasive edge which is a source of injury to workers and which may cut or tear the fabric placed over an innerspring mattress constructed using such a clip.

As evidenced by the above background, there still exists a need for an improved sheet metal clip and a method for interconnecting such clips to form a stack which overcomes these identified shortcomings while still providing a strong and flexible interconnection which does not inhibit the effective clamping of wires as applied with a clinching tool.

SUMMARY OF THE INVENTION

It has been an objective of the present invention to provide an improved sheet metal clip which is interconnected with the requisite flexibility and tensile strength in a stacked configuration for use in the mattress and bedding industry.

An additional objective has been to provide a stack of sheet metal clips which can be used with current clinching tools common in the mattress and bedding manufacturing industry.

A further objective of the invention has been to provide a stack of sheet metal clips which yields no sharp edges when a clip is severed from the stack.

A further objective of the present invention has been to provide a sheet metal clip which yields a secure and quiet or non-squeaking clamp when joining wires in a mattress or box-spring assembly.

These objectives are attained by an improved generally U-shaped sheet metal clip. The clip has an arcuate crown portion and spaced generally parallel leg portions depending from the crown portion. The clip has spaced side edges into which side slots are cut. Additionally, a slot is cut into the crown on each side edge of the clip. This crown slot is generally colinear with the axis of the crown of the clip. A pair of tabs are formed on each side edge of the clip between the side slots and the crown slot.

The improved U-shaped metal clips are aligned in a stacked configuration to be similarly oriented having their crown portions generally parallel to one another with an outside face of the leg portion of each clip abutting an outside face of a leg portion of an adjacent clip.

The clips are held in this collated stack configuration by plastic rope inserted within the side slots on each side edge of the clips. The plastic rope interconnects the collated stack of sheet metal clips with the flexibility and tensile strength required for winding and unwinding vast quantities of collated stacked clips onto and off of a spool and for use with existing clinching tools.

The plastic rope is retained in the side slots of the clips by a pair of tabs on each side of the clip. The tabs are formed between the side slots and the crown slot on each side of the clip. The tabs are deflected or crimped downwardly after the rope is inserted within the side slots to thereby retain the rope within the slots.

When the collated stack of clips of the present invention is used with a clinching tool to clamp wires or innersprings within mattresses or the like, the leading clip of the stack will be severed from the stack and the portion of the plastic rope joining the leading clip to the stack will be cut. However, since the rope which interconnects the clips of the present invention is plastic, and not metal, no sharp edges will be created on the severed rope portions when the leading clip is cut from the stack.

Additionally, the section of the plastic rope which is severed along with the leading clip of each stack will be clamped within the arcuate crown portion of the clip around the wires or springs of the mattress. In that the rope is plastic, as opposed to metal, the portion clamped with the wires will enhance the effectiveness of the clip by acting as a buffer or sound absorbing material to prevent squeaks, as opposed to being a source of them within the clamped wires.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
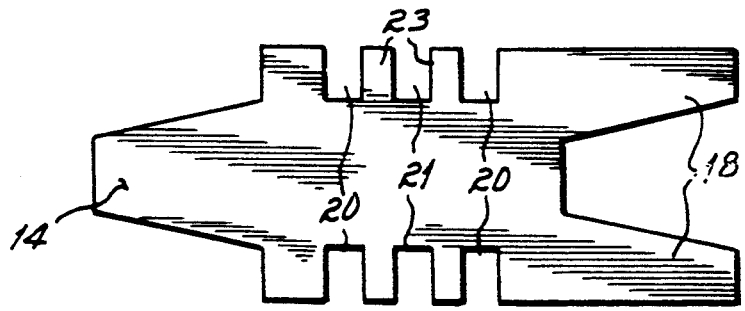
FIG. 1 is a plan view of a blank used to form a clip of the present invention.

A sheet metal blank 10 used to form a preferred embodiment of a clip 12 according to the present invention is shown in FIG. 1. The blank 10 is generally planar and is bent along a lateral mid-section plane to form the generally U-shaped clip configuration shown in FIG. 2. The blank 10 has a single prong 14 leg portion 16 which when clamped around a plurality of wires (not shown) fits between dual prongs 18 of an opposed leg portion 16 of the clip. A pair of side slots 20 are formed on each side edge of the clip 12. A crown slot 21 is cut into each side edge of the clip 12 between the side slots 20. The crown slot 21 is also rectangular in the preferred embodiment. The crown slot 21 is generally colinear with the axis of the crown of the clip 12 when formed into the U-shape as in FIG. 2. A pair of tabs 23 are formed on each side edge of the clip 12 between the side slots 20 and the crown slot 21. The tabs 23 are also preferably rectangular in the clip 12 of this invention.

Figure 3:
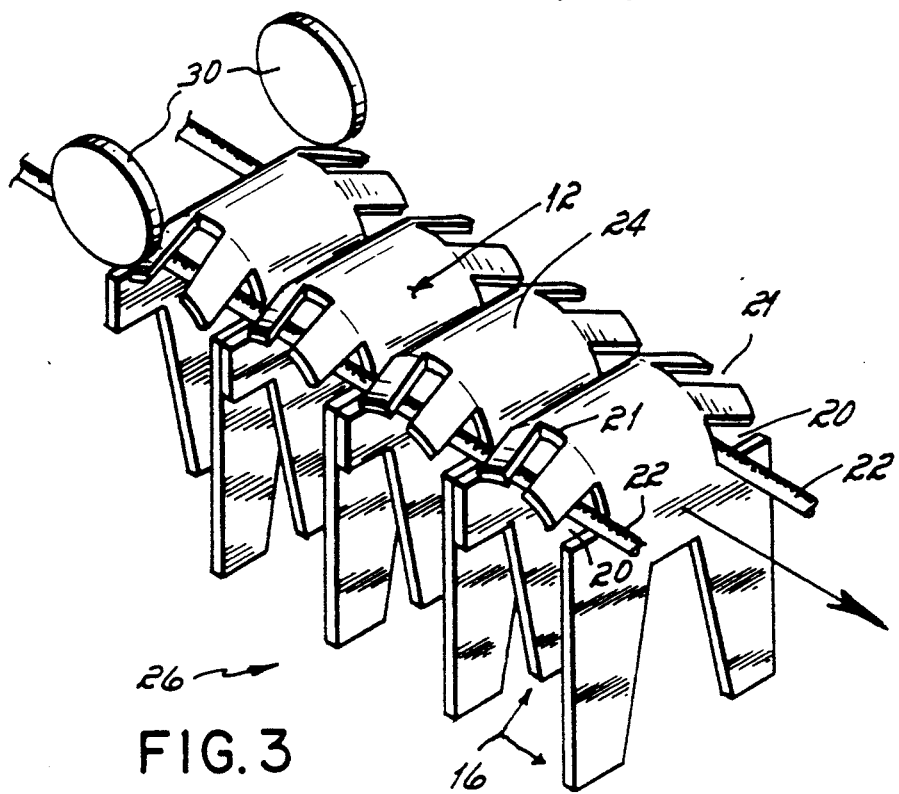
FIG. 3 is a perspective view of a portion of a collated stack of clips in which tabs on the crown portion of each clip are deflected downwardly to retain a plastic rope within side slots of each clip.

The clip blank 10 is bent to form the U-shaped clip 12 of which a number of U-shaped clips 12 are shown interconnected by a pair of plastic ropes 22 inserted within the side slots 20 of each clip 12 as shown in FIG. 3. Each clip 12 has an arcuate crown portion 24 from which each leg portion 16 depends downwardly. The side slots 20 of the clip 12 of the present invention are rectangularly shaped and are sized to be large enough to accept the rope 22 therein.

As shown in FIG. 3, the clips 12 of a collated stack 26 are similarly oriented and aligned having their crown portions 24 generally parallel with one another and the leg portion 16 of each clip 12 abutting and lying in face to face contact with the leg portion 16 of an adjacent clip 12. With the clips 12 juxtapositioned in such a manner, the side slots 20 are aligned to permit the rope 22 to be inserted therein and extend the length of the collated stack 26 of clips 12.

The rope 22 of the present invention used to interconnect the clips 12 into the collated stack 26 is fabricated from a plastic material, preferably a low density polyethylene or polyester plastic. Such a rope 22 provides flexibility in the collated stack 26 of clips 12 which is required when bending and winding the stack 26 onto a spool (not shown). Additionally, the plastic rope 22 offers the required tensile strength to withstand the pulling and twisting forces experienced by the stack 26 of clips 12 without breaking. Lastly, when the clip 12 is severed from the stack of clips, the plastic rope 22 does not produce a sharp or jagged barb which is potentially injurious to workers and can tear the fabric covering the mattress into which the clip 12 is incorporated.

Figure 2:
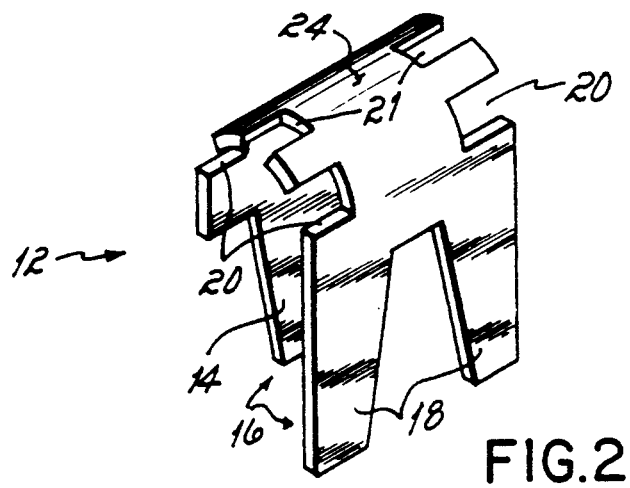
FIG. 2 is a perspective view of a clip formed from the clip blank of FIG. 1.

As shown in FIG. 2, the tabs 23 on each lateral end of the crown portion 24 of the clip 12 are created in part by the side slots 20 and the crown slot 21 extending from the side edge of each clip 12. After the rope 22 has been inserted within the side slots 20 of the stack 26 of clips 12, the tabs 23 are deflected or crimped downwardly as by rollers 30 or another suitable mechanism (FIG. 3). The plastic rope 22 is thusly prevented from dislodging out of the slot and thereby rupturing the collated stack 26 of clips. The tabs 23 are easily deflected downwardly with the inclusion of the crown slot 21; otherwise the portion of the crown 24 which is deflected would bind and not easily deform when crimped by the rollers 30. As a result of the side slots 20 and the crown slots 21, the rope 22 is securely held in the side slots 20 by the deflected tabs 23.

It will be appreciated by one of skill in the art that clips of other shapes and geometries with slots in other positions than those identified herein could be used to form the collated stack of clips joined by ropes according to the present invention.

From the above disclosure of the general principles of the present invention and the preceding detailed description of the preferred embodiments, those skilled in the art will readily comprehend the various modifications to which the present invention is susceptible. Therefore, we desire to be limited only by the scope of the following claims.

We claim:

1. A collated stack of sheet metal clips comprising:
   a plurality of similarly oriented generally U-shaped clips, each said clip having an arcuate crown portion and spaced parallel leg portions depending from said crown portion, each said clip being juxtapositioned to a leg portion of an adjacent clip, each said clip having opposed lateral side edges;
   a side slot extending inwardly from each said side edge of each said leg portion;
   a crown slot extending inwardly from a lateral side edge of said crown portion; and
   a plastic rope positioned within said side slots and extending the length of the stack of clips.

2. The stack of clips of claim 1 further comprising:
   means for retaining said rope within said side slots.

3. The stack of clips of claim 2 wherein said retaining means comprises a pair of tabs extending from each lateral end of said crown portion of each said clip, said tabs being defined in part by said side slots in said spaced leg portions and said crown slot, said tabs being deflected after insertion of said ropes into said side slots so as to retain said ropes within said side slots.

4. The stack of clips of claim 3 wherein said tabs are deflected downwardly toward said leg portion of each said clip.

5. The stack of clips of claim 1 wherein each said side slot is generally orthogonal to one of said side edges of said clip.

6. A method of manufacturing a collated stack of sheet metal clips comprising the steps of:

forming a planar sheet metal blank into a generally U-shaped clip having an arcuate crown portion and spaced parallel leg portions depending from said crown portion, said clip having opposed side edges, a side slot extending inwardly from each said side edge of said clip and a crown slot extending inwardly from a side edge of said crown portion;

aligning a plurality of said similarly oriented U-shaped clips such that each said clip is juxtapositioned to a leg portion of an adjacent said clip;

inserting a plastic rope within said side slots on each said side edge of said clips; and deflecting tabs extending from each lateral end of said crown portion of each said clip, said tabs being defined in part by said side slots in said spaced leg portions, and said crown slot, said tabs being deflected after insertion of said rope into said slots so as to retain said rope within said slots.

7. The method of claim 6 wherein said deflecting step comprises deflecting said tabs downwardly toward said leg portion of each said clip.

* * * * *